US005117928A

United States Patent [19]
Weihe

[11] Patent Number: 5,117,928
[45] Date of Patent: Jun. 2, 1992

[54] APPARATUS FOR SORTING AND TRANSFERRING FLATWARE INTO A FLATWARE HOLDING DEVICE

[76] Inventor: Clyde Weihe, 17 Lindbergh Ave., Needham Heights, Mass. 02194

[21] Appl. No.: 761,317

[22] Filed: Sep. 17, 1991

[51] Int. Cl.⁵ .......................... G01G 19/52; B07C 5/12
[52] U.S. Cl. ........................................ 177/50; 209/926
[58] Field of Search ................... 177/50, 145; 209/926

[56] References Cited

U.S. PATENT DOCUMENTS

| | | | |
|---|---|---|---|
| 3,756,403 | 9/1973 | Noren et al. | 209/926 X |
| 3,956,109 | 5/1976 | Dietsche | 209/926 X |
| 4,488,610 | 12/1984 | Yankloski | 177/50 X |
| 4,954,250 | 9/1990 | Weihe et al. | 209/926 X |

Primary Examiner—George H. Miller, Jr.
Attorney, Agent, or Firm—M. Lawrence Oliverio

[57] ABSTRACT

Apparatus for receiving and sorting a plurality of pieces of flatware for delivery of the flatware to a holding or storage mechanism, the apparatus comprising a tube mechanism comprising a wall forming a tube having an open end for slidable delivery of the flatware pieces to a holding mechanism, the tube mechanism having a selected length, a selected internal volume and a slot extending lengthwise in the wall for receiving pieces of flatware lengthwise through the slot, the flatware pieces having a selected length and depth. The tube mechanism is pivotably mounted on a support structure at a selected point along the length of the tube mechanism such that the slot is disposed upwardly for receiving the pieces of flatware downwardly through the slot and into the internal volume of the tube mechanism. The tube mechanism is pivotably mounted on the support structure for pivoting between a stationary at-rest position and non-stationary positions such that the tube mechanism is disposed in a tilted orientation relative to horizontal when in the stationary at-rest position. The support structure includes a pivot stop for limiting the degree of the tilted orientation of the at-rest position. A stop mechanism is included for holding pieces of flatware received within the internal volume of the tube mechanism against sliding out of the tube mechanism when the tube is in the at-rest tilted orientation.

14 Claims, 3 Drawing Sheets

APPARATUS FOR SORTING AND TRANSFERRING FLATWARE INTO A FLATWARE HOLDING DEVICE

BACKGROUND OF THE INVENTION

The present invention relates to apparati for sorting a collection of knives, forks and spoons, and more particularly, to sorting individual pieces of flatware and transferring a certain number of individual pieces to a holding mechanism such as a flatware holding basket such that the holding mechanism is not overfilled.

SUMMARY OF THE INVENTION

In accordance with the invention there is provided an apparatus for receiving and sorting a plurality of pieces of flatware for delivery of the flatware to a washing, holding or storage mechanism. The apparatus comprises a tube mechanism comprising a wall forming a tube having an open end for slidable delivery of flatware pieces received within the tube out of the open end into a holding mechanism, the tube mechanism having a selected length, a selected internal volume and a slot extending lengthwise in the wall for receiving pieces of flatware lengthwise through the slot. The flatware pieces have a selected length and depth and the tube mechanism is pivotably mounted on a support structure at a selected point along the length of the tube mechanism. The tube mechanism is mounted such that the slot is disposed upwardly for receiving the pieces of flatware downwardly through the slot and into the internal volume of the tube mechanism. The tube mechanism is pivotably mounted on the support structure for pivoting between a stationary at-rest position and non-stationary positions such that the tube mechanism is disposed in a tilted orientation relative to horizontal when in the stationary at-rest position. The support structure includes a pivot stop for limiting the degree of the tilted orientation of the at-rest position and holding the tube in the at-rest position. A stop mechanism is included for holding pieces of flatware received within the internal volume of the tube mechanism against sliding out of the tube mechanism when the tube is in the at-rest tilted orientation. The tube mechanism is typically pivotably mounted at a point along the selected length of the tube mechanism which is spaced away from the center of the axis or length of the tube mechanism such that the tube will automatically pivot in a selected direction under the force of gravity. A longer length portion of the tube mechanism typically extends in one direction from the point of pivotable mounting and a smaller length portion of the tube mechanism extends in an opposite direction from the point of pivotable mounting, the longer length portion being downwardly pivoted when the tube mechanism is in the at-rest position. The tube mechanism is typically pivotably mounted to the support structure by a pivot mechanism attached to the wall of the tube mechanism. The pivot mechanism may be spring biased to constantly urge the tube mechanism into the tilted orientation in the at-rest position.

Preferably, the length and the internal volume of the tube mechanism is preselected relative to the selected length and depth of the pieces of flatware such that only a selected maximum number of the pieces of flatware can be received within the internal volume of the tube mechanism.

Most preferably, the tube mechanism includes a fin mechanism extending upwardly from the edges of the slot and further extending lengthwise along the edges of the slot to a point spaced a selected distance from the open end of the tube mechanism.

The apparatus preferably further comprises a flatware holding mechanism having a mouth, at least the open end of the tube mechanism having a cross-sectional area selected to allow the open end of the tube mechanism to be longitudinally receivable into the mouth of the holding mechanism. The holding or basket mechanism typically has a selected interior volume for receiving a selected maximum number of flatware pieces, the length and interior volume of the tube mechanism being selected to receive a maximum number of flatware pieces which is less than the maximum number of flatware pieces which the selected interior volume of the basket mechanism can receive.

The tube mechanism typically has an interior wall size and shape and the apparatus most preferably further comprises a tubular insert having a tubular wall of selected thickness and length and an exterior wall size and shape which is complementary to the interior wall size and shape of the tube mechanism such that the insert may be inserted into the tube mechanism through the open end of the tube mechanism reducing the internal volume of the tube when the insert is inserted into the tube mechanism. The insert includes a slot extending lengthwise in the wall of the insert, the slot in the insert being complementary in size and shape to the size and shape of the slot in the tube. The insert preferably also includes an alignment mechanism for aligning the slots of the tube and the insert.

The alignment mechanism typically comprises protrusions extending outwardly from the edges of the insert slot, the protrusions being disposed on the edges of the insert slot such that the insert may be inserted into the tube mechanism through the open end of the tube only in an orientation where the slot of the insert is aligned with the slot of the tube mechanism.

Flatware pieces which are placed within the tube or within an insert which has been inserted within a tube may be slidably emptied out of the tube or an insert placed in a tube by placing a holding mechanism over the open end of the tube mechanism when in the at-rest position and applying a pivot force, e.g. manually, to the holding mechanism causing the tube mechanism to pivot such that the open end of the tube mechanism is downwardly tilted. When the open end is downwardly pivoted, flatware pieces which have been placed in the tube slide under force of gravity out of the open end into the holding mechanism.

The mouth of the holding mechanism readily receives the open end of the tube mechanism and the holding mechanism is readily removable from the open end after it has been received such that when flatware pieces have been slidably delivered into the holding mechanism through the open end the holding mechanism is readily removable with the delivered flatware pieces residing or held within the holding mechanism.

DETAILED DESCRIPTION OF PREFERRED EMBODIMENTS

Figure 1:
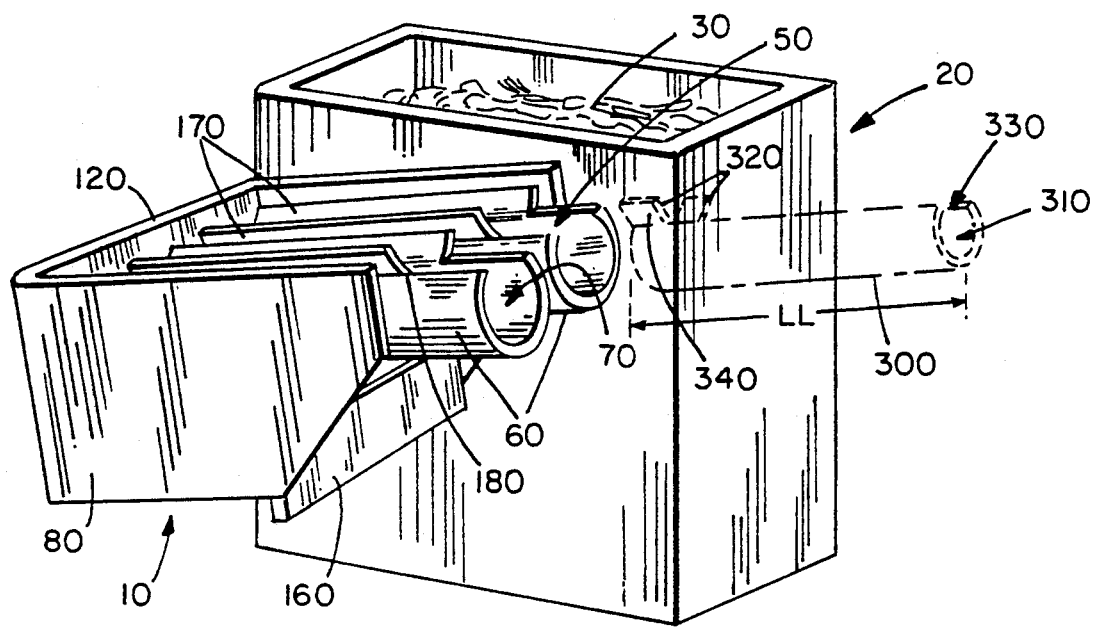
FIG. 1 is an isometric view of a flatware sorting apparatus according to the invention mounted on the side of flatware holding bin.

A flatware receiving apparatus 10 according to the invention is shown in FIG. 1 attached to the side of a flatware storage bin 20 such as a washing bin, drying bin or the like. In a typical embodiment, a worker in the kitchen of a large cafeteria or food service facility removes individual pieces of a collection of intermingled flatware 30, i.e. forks, knives and spoons, from the bin 20 for purposes of sorting the intermingled pieces and eventually storing them in a holding basket 40, FIGS. 2, 3, typically for purposes of placing filled baskets of one type of flatware in a cafeteria for easy usage by patrons of the cafeteria. In the course of sorting the flatware 30, the worker manually delivers individual pieces of the sorted flatware into an upwardly disposed slot 50 provided in a tube 60 of the apparatus 10. The slot 60 extends longitudinally along the length of the tube 50 a length sufficient to allow the flatware pieces to be received through the slot 60 and into the internal volume 70, FIG. 1, of the tube 60.

Figure 2:
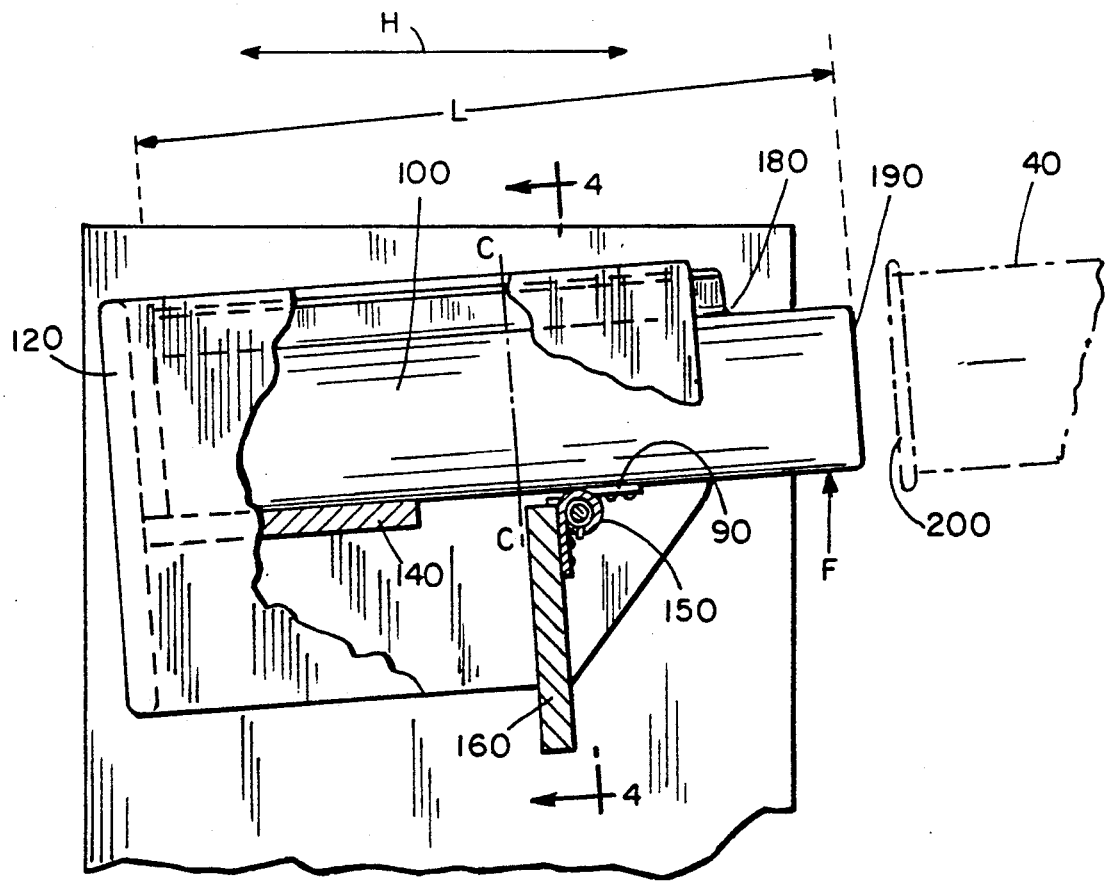
FIG. 2 is a side partial cut-away view of the apparatus shown in FIG. 1 showing a delivery tube in an at-rest loading position.
Figure 3:
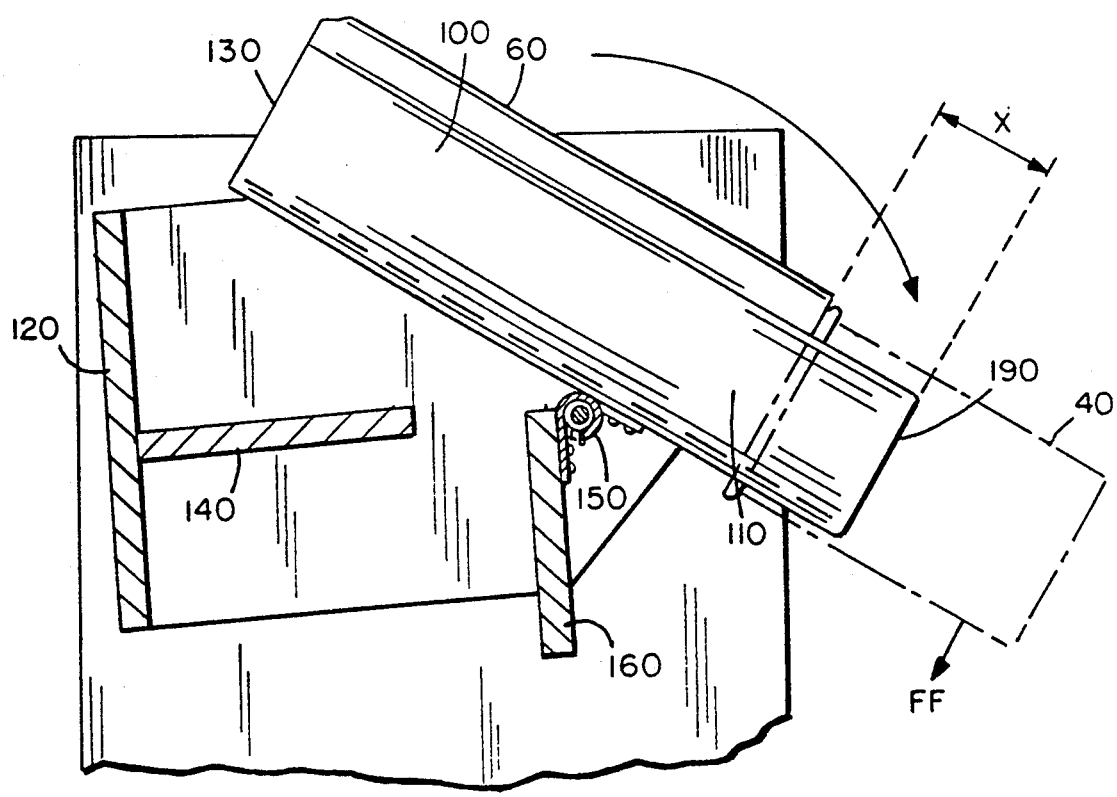
FIG. 3 is a side partial cut-away view of the apparatus of FIG. 1 showing the delivery tube of the apparatus in a pivoted position for delivering flatware into a storage basket.

The tube(s) 60 is/are pivotably mounted on a support structure 80, typically at a point 90 along the length L of the tube 60, FIGS. 1, 2, which is offset from the center of gravity line C of the tube 60 such that if the tube 60 is not subject to interference or another force applied to the tube 60, the tube 60 will tend to tilt under the force of gravity around the pivot point 90. As shown in FIGS. 1-3, the tube 60 is mounted such that a longer and heavier length portion 100 extends toward the rearward end of support structure 80 and a shorter, lighter length portion 110 extends toward the forward open end of support structure 80.

As shown in FIGS. 1-3, the rearward end of structure 80 has a rear wall 120 which acts as an interference stop for preventing flatware pieces which have been placed inside 70 the tube 60 from sliding out the rearward and 130 of the tube 60 when the tube 60 is tilted downwardly relative to horizontal as shown in FIGS. 1, 2. As shown in FIGS. 1, 2 the support structure 80 includes a pivot stop wall 140 for limiting the degree to which the tube 60 may pivot around point 90. The support structure is typically stationarily mounted, such as on the side of bin 20 or by sitting on a level surface, such that the tube(s) 60 can assume a stable at-rest position as shown, for example, in FIGS. 1, 2 which is tilted relative to horizontal H. The pivot stop 140 is disposed on the support structure at a location or point which is selected to interfere with the pivot motion of the tube 60 such that when the tube 60 interferes or engages with the stop 140 it is in a stable at-rest position with the axis of the tube 60 and is tilted relative to horizontal H.

The tube 60 will naturally tend to assume the tilted at-rest position by virtue of the off-center pivot mounting described above whereby the force of gravity naturally acts to cause the longer length portion 100 to engage the pivot stop 140 and remain in such pivoted position. Alternatively, a constant lever or off-center pivot force F, FIG. 2, can be applied to the tube 60 to constantly urge the tube 60 to pivot into engagement with stop mechanism 140. Such constant force F can be provided by utilizing a spring biased pivot mechanism or hinge 150 which is attached to both the wall of the tube 60 and a mounting wall support 160. Depending upon the strength of the spring biased mechanism 150, the mechanism 150 may be attached to the tube 60 at any point along the axial (longitudinal) length of the tube 60 as long as the spring 150 has enough spring bias strength to urge the tube to pivot into interference engagement with stop 140 when no forces other than gravity which could affect pivot motion are acting on the tube 60.

When the tube 60 is in the at-rest position, flatware pieces which are inserted through the slot 50 into the interior 70 of the tube 60 will tend to slide downwardly under force of gravity toward the rearward end 130 of tube 60. If the rearward and 130 of the tube 60 is open, the flatware pieces can be held within the tube 60 by rear wall 120 which is disposed close enough behind end 130 of tube 60 to prevent the flatware pieces from sliding out. Alternatively, a stop mechanism such as a wall can be attached on or near the and 130 of tube 60 itself such that and 130 is effectively closed.

The slot 50 is disposed longitudinally along the wall of the tube 60 and preferably has a slot width which is selected to prevent the flatware pieces from being inserted through the slot 50 in any orientation other than one where the flatware pieces are aligned substantially lengthwise parallel to the tubular axis of the tube 60 when being inserted.

Fins 170 protruding outwardly from the edges of slot 50 are typically provided for better guidance of flatware pieces into and through slot 50. The fins 170 preferably extend longitudinally along the length of the slots 50 up to a point 180 spaced a selected distance X away from the front delivery end 190 of the tube 60, FIGS. 1-3. The distance X is selected to allow the end 190 of tube 60 to be inserted through and into the open mouth 200 of basket 40 a distance X sufficient to allow the basket 40 to effectively engage around the outside surface of tube 60 such that the tube 60 can be effectively pivoted out of the at-rest position as shown, for example, in FIG. 3 by application of a lever or pivoting force FF to basket 40. The forward end of the fins 170 also acts as a stop against the mouth 200 of basket 40 for limiting the degree of insertion of the end 190 of tube 60 into basket 40.

The front end 190 of tube 60 is open such that when the volume 70 of tube 60 is filled, the user may pivot the tube 60 forwardly, FIG. 3, and cause the flatware pieces to slide forwardly through open end 190 and into a basket 40.

Figure 5:
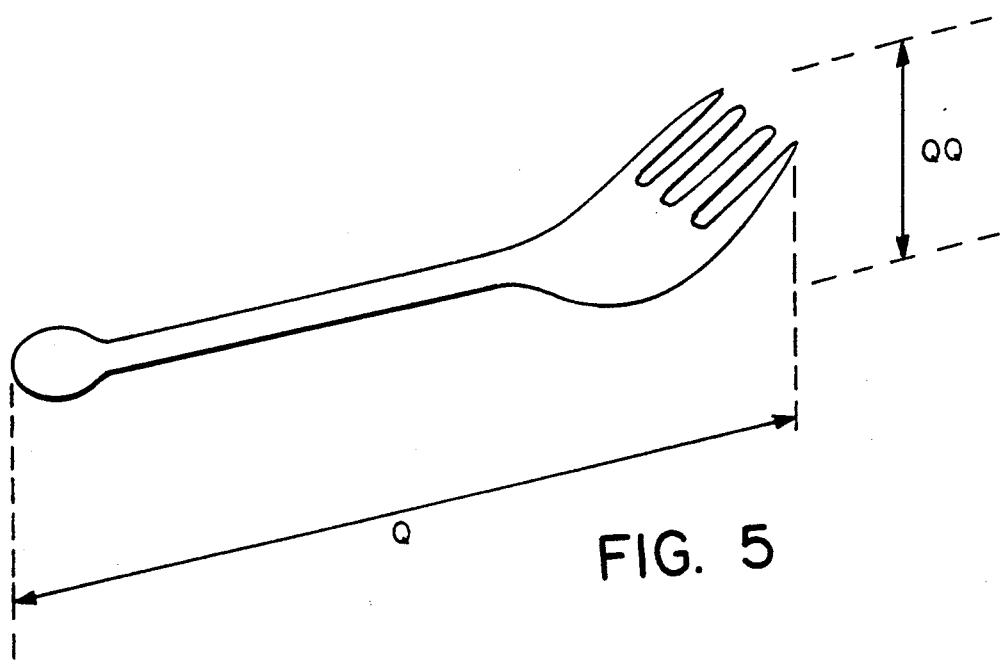
FIG. 5 is a side isometric view of a fork showing by example a length and depth feature of a flatware piece.

The interior volume 70 and the length L of tube 60 is selected to accommodate receipt of a predetermined maximum number of flatware pieces having a predetermined length and depth. Forks, spoons and knives come in many different lengths and shapes but all typically have a maximum length Q and maximum depth QQ as shown, for example, in FIG. 5.

In typical use, a tube 60 is filled with flatware pieces 30 to the maximum capacity of volume 70. As the tube 60 is being filled with flatware pieces, the flatware pieces collect within the volume 70 first toward the end 100 by virtue of gravity induced sliding. The tube 60 is stable in the at-rest position during its being filled up as described above. Once the tube 60 is filled to capacity, the worker is forced to place a storage basket 40 over open end 190 in order to unload the tube 60. The volume 70 and length L are preselected such that the maximum loading capacity of flatware pieces within tube 60 is less than the number of flatware pieces which would normally be considered an overload of the flatware piece holding volume or capacity of basket 40. Thus by limiting the interior volume and length of tube 60, a holding basket 40 will never be overloaded.

Figure 4:
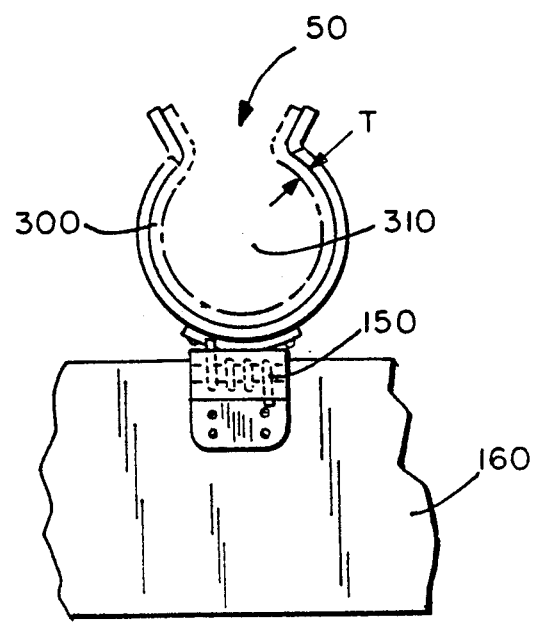
FIG. 4 is an end cross-sectional view along lines 4—4 in FIG. 2 showing the tube in cross-section and a hinge pivot mechanism attached to the tube.

For purposes of accommodating the use of apparatus 10 to flatware pieces of variable size and shape and holding or storage baskets 40 of variable holding volume capacity, a volume reducing insert 300 may be provided, FIGS. 1, 4.

The thickness T, FIG. 4, of the walls of the insert 300 is selected according to a known set of Q and QQ values for any preselected set of flatware pieces such that only a predetermined maximum number of flatware pieces having preselected length Q and depth QQ can be inserted within the interior volume 310 of insert 300. As shown in FIGS. 1, 4, the exterior wall contour of insert 300 is complementary in size and shape to the interior wall contour, size and shape of tube 60 such that the insert 300 fits coaxially and typically snugly within the tube 60 reducing the interior volume 70 of the tube to the smaller interior volume 310 of insert 300. As shown in FIG. 1, the insert 300 is slidable into tube 60 from open end 190 of tube 60. The length of insert 300 is typically selected to be the same or similar to the length L of tube 60 such that a continuous tubular interior surface is formed within tube 60 when an insert 300 is inserted.

As shown in FIG. 1, the insert 300 is provided with protrusions 320 extending outwardly from opposing edges of a flatware receiving slot 330 provided in the insert 300. The slot 300 extends lengthwise along the length LL of the insert. The protrusions 320 serve to prevent the insertion of insert 300 into the tube 60 in any orientation other than one where the slot 330 is aligned with slot 50. The distance between the outside surfaces 340 of the protrusions 320 at their point of connection to the edges of slot 330 is less than the distance between the opposing edges of slot 50 such that the protrusions do not interfere with insertion when the two slots 330 and 50 are aligned with each other as shown in FIG. 1. Typically the insert 300 is comprised of a rigid and somewhat bendably resilient material such as plastic which can be bent somewhat such that the opposite edges of the slot 330 can be squeezably brought closer together in order to fit the protrusions 320 between the opposite edges of slot 50 if, for any reason, the clearance between the outside surfaces 540 of protrusions 320 is not sufficient to enable their fitting through the front end of slot 50.

Figure 6:
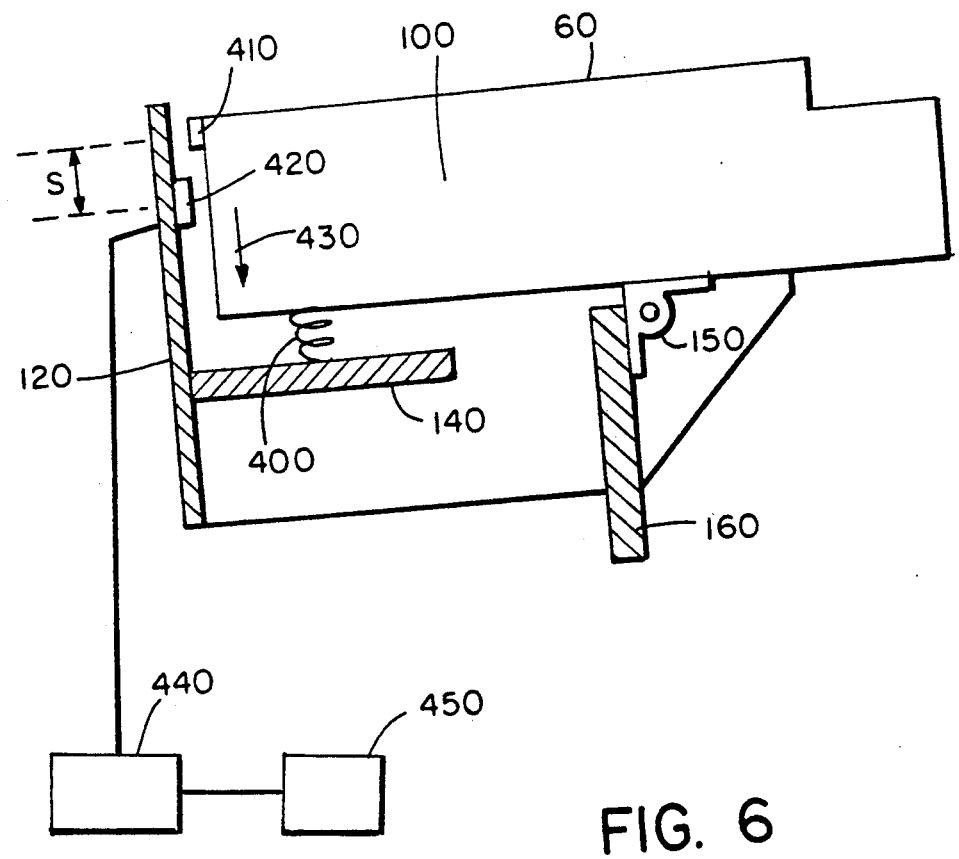
FIG. 6 is a schematic side view of a tube of an apparatus according to the invention in an at-rest position showing a compressible spring support for the tube and a pair of proximity switches connected to a battery and associated signal mechanism for sensing the weight of flatware pieces placed in a tube and providing a signal upon detection of a preselected weight of flatware pieces residing in the tube.

The apparatus may also be provided with a mechanism which senses the weight of the flatware pieces which have been placed within a tube 60. The weight sensing mechanism preferably includes or is connected to a human sensory alarm device such as a light or sound signalling mechanism which is activated when the wright sensing mechanism senses a preselected or predetermined weight value. As shown, for example, in FIG. 6, a resiliently compressible spring 400 is mounted on support stop 140 such that when tube 60 is empty and in the at-rest position, the spring 400 holds the tube 60 in the at-rest position as shown in FIG. 6. A pair of proximity switches 410, 420 are respectively mounted such that they are spaced a preselected distance S away from each other when the tube 60 is empty and in the at-rest position shown in FIG. 6. The distance S and the compression strength of spring 400 are preselected such that when the tube 60 is filled with a certain preselected maximum number of flatware pieces, the weight 430 of the preselected maximum number of flatware pieces will push downwardly on spring 400 and concomitantly move switch 410 downwardly through the distance S into a switch closed proximity with switch 420. The switches 410, 420 are connected via conventional circuitry to a battery 440 and a human sensory signal 450 such as a light, buzzer or bell. When the proximity switches 41, 420 are in close enough proximity due to the weight of the preselected maximum number of flatware pieces in tube 60 compressing spring 400, the circuit will be closed and the signal 450 is activated notifying the user that the tube is filled to capacity with the preselected maximum number of flatware pieces and should be emptied in the manner shown and described with reference to FIG. 3.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Apparatus for receiving and sorting a plurality of pieces of flatware for delivery of the flatware to a holding or storage mechanism, the apparatus comprising:

a tube mechanism comprising a wall forming a tube having an open end, the tube mechanism having a selected length, a selected internal volume and a slot extending lengthwise in the wall for receiving pieces of flatware lengthwise through the slot, the flatware pieces having a selected length and depth;

the tube mechanism being pivotably mounted on a support structure at a selected point along the length of the tube mechanism;

the tube mechanism being mounted such that the slot is disposed upwardly for receiving the pieces of flatware downwardly through the slot and into the internal volume of the tube mechanism;

the tube mechanism being pivotably mounted on the support structure for pivoting between a stationary at-rest position and non-stationary positions such that the tube mechanism is disposed in a tilted orientation relative to horizontal when in the stationary at-rest position;

the support structure including a pivot stop for limiting the degree of the tilted orientation of the at-rest position; and a stop mechanism for holding pieces of flatware received within the internal volume of the tube mechanism against sliding out of the tube mechanism when the tube is in the at-rest tilted orientation.

2. The apparatus of claim 1 wherein the tube mechanism is pivotably mounted at a point along the selected length of the tube mechanism which is spaced away from the center of the axis or length of the tube mechanism.

3. The apparatus of claim 2 wherein a longer length portion of the tube mechanism extends in one direction from the point of pivotable mounting and a smaller length portion of the tube mechanism extends in an opposite direction from the point of pivotable mounting, the longer length portion being downwardly pivoted when the tube mechanism is in the at-rest position.

4. The apparatus of claim 1 wherein the tube mechanism is pivotably mounted to the support structure by a pivot mechanism attached to the wall of the tube mechanism.

5. The apparatus of claim 4 wherein the pivot mechanism is spring biased to urge the tube mechanism into the tilted orientation in the at-rest position.

6. The apparatus of claim 1 wherein the length and the internal volume of the tube mechanism is selected relative to the selected length and depth of the pieces of flatware such that only a selected maximum number of the pieces of flatware can be received within the internal volume of the tube mechanism.

7. Apparatus of claim 1 wherein tube mechanism includes a fin mechanism extending upwardly from the edges of the slot and further extending lengthwise along the edges of the slot to a point spaced a selected distance from the open end of the tube mechanism.

8. Apparatus of claim 1 further comprising a flatware holding mechanism having a mouth, at least the open end of the tube mechanism having a cross-sectional area selected to allow the open end of the tube mechanism to be longitudinally receivable into the mouth of the basket mechanism.

9. Apparatus of claim 8 wherein the holding mechanism has a selected interior volume for receiving a selected maximum number of flatware pieces, the length and interior volume of the tube mechanism being selected to receive a maximum number of flatware pieces which is less than the maximum number of flatware pieces which the selected interior volume of the storage basket mechanism can receive.

10. Apparatus of claim 1 wherein the tube mechanism has an interior wall size and shape, the apparatus further comprising a tubular insert having a tubular wall of selected thickness and length and an exterior wall size and shape which is complementary to the interior wall size and shape of the tube mechanism such that the insert may be inserted into the tube mechanism through the open end of the tube mechanism reducing the internal volume of the tube when the insert is inserted into the tube mechanism, the insert further including a slot extending lengthwise in the wall of the insert, the slot in the insert being complementary in size and shape to the size and shape of the slot in the tube.

11. Apparatus of claim 10 wherein the insert includes an alignment mechanism for aligning the slots of the tubes and the insert.

12. Apparatus of claim 11 wherein the alignment mechanism comprises protrusions extending outwardly from the edges of the insert slot, the protrusions being disposed on the edges of the insert slot such that the insert may be inserted into the tube mechanism through the open end of the tube only in an orientation where the slot of the insert is aligned with the slot of the tube mechanism.

13. Apparatus of claim 1 further comprising a flatware holding mechanism having a mouth into which the open end of the tube mechanism is insertable, the tube mechanism being pivotable when the open end of the tube mechanism is inserted into the holding mechanism by application of pivoting force on the holding mechanism such that the open end of the tube mechanism is pivotable into a downwardly oriented pivot position, the flatware pieces received within the tube mechanism being slidable under the force of gravity through the open end of the tube mechanism into the holding mechanism when the open end is pivoted into the downwardly oriented pivot position.

14. Apparatus of claim 1 further comprising a weight sensing mechanism connected to the tube mechanism and a signal mechanism connected to the weight sensing mechanism, the weight sensing mechanism sensing the weight of flatware pieces received within the tube mechanism and activating the signal mechanism upon sensing of a predetermined weight.

* * * * *